US007433889B1

(12) United States Patent
Barton

(10) Patent No.: US 7,433,889 B1
(45) **Date of Patent: *Oct. 7, 2008**

(54) METHOD AND SYSTEM FOR OBTAINING TRAFFIC SIGN DATA USING NAVIGATION SYSTEMS

(75) Inventor: Mark A. Barton, Schaumburg, IL (US)

(73) Assignee: Navteq North America, LLC, Chicago, IL (US)

( * ) Notice: Subject to any disclaimer, the term of this patent is extended or adjusted under 35 U.S.C. 154(b) by 260 days.

This patent is subject to a terminal disclaimer.

(21) Appl. No.: 10/214,216

(22) Filed: Aug. 7, 2002

(51) Int. Cl.
*G06F 7/00* (2006.01)
*G06F 17/00* (2006.01)
*G06F 19/00* (2006.01)

(52) U.S. Cl. ......................... 707/104.1; 707/1; 701/117

(58) Field of Classification Search ............. 707/104.1, 707/1; 701/213–301, 209, 117; 340/37, 340/23; 709/239; 710/96
See application file for complete search history.

(56) References Cited

U.S. PATENT DOCUMENTS 3,739,332 A * 6/1973 Martinez .................... 340/919
4,220,946 A * 9/1980 Henriot ...................... 340/994
4,982,332 A 1/1991 Saito et al.
5,173,691 A 12/1992 Sumner
5,444,442 A * 8/1995 Sadakata et al. ............ 340/916
5,539,645 A 7/1996 Mandhyan et al.
5,699,056 A 12/1997 Yoshida
5,913,917 A * 6/1999 Murphy ...................... 701/123
5,931,888 A 8/1999 Hiyokawa
5,933,100 A 8/1999 Golding
6,047,234 A 4/2000 Cherveny et al.
6,150,961 A 11/2000 Alewine et al.
6,154,152 A 11/2000 Ito
6,178,374 B1 1/2001 Mohlenkamp et al.
6,202,024 B1 3/2001 Yokoyama et al.
6,236,932 B1 5/2001 Fastenrath
6,236,933 B1 5/2001 Lang
6,263,276 B1 7/2001 Yokoyama et al.
6,292,719 B1 9/2001 Seto et al.
6,292,747 B1 9/2001 Amro et al.
6,295,492 B1 9/2001 Lang et al.
6,330,511 B2 * 12/2001 Ogura et al. ................ 701/301
6,334,086 B1 12/2001 Park et al.
6,338,021 B1 * 1/2002 Yagyu et al. ................ 701/209
6,385,539 B1 5/2002 Wilson et al.
6,470,262 B2 10/2002 Kerner et al.
6,526,352 B1 * 2/2003 Breed et al. ................. 701/213

(Continued)

FOREIGN PATENT DOCUMENTS

WO WO 98/54682 12/1998

(Continued)

*Primary Examiner*—Apu Mofiz
*Assistant Examiner*—Te Chen
(74) *Attorney, Agent, or Firm*—Jon D. Shutter; Frank J. Kozak; Lisa M. Schoedel

(57) ABSTRACT

A method for collecting data for a geographic database is disclosed. Speed and position data are collected using a plurality of mobile computing platforms moving in a geographic region. The speed and position data are analyzed to identify a location of a traffic sign corresponding to a change in the speed. The geographic database is updated to indicate the location of the traffic sign.

20 Claims, 8 Drawing Sheets

U.S. PATENT DOCUMENTS

| | | | | |
|---|---|---|---|---|
| 6,577,946 | B2 * | 6/2003 | Myr | 701/117 |
| 6,629,034 | B1 * | 9/2003 | Kozak et al. | 701/200 |
| 6,900,740 | B2 * | 5/2005 | Bloomquist et al. | 340/905 |
| 2002/0156572 | A1 | 10/2002 | Bullock et al. | |
| 2003/0023614 | A1 * | 1/2003 | Newstrom et al. | 707/104.1 |
| 2003/0096621 | A1 * | 5/2003 | Jana et al. | 455/456 |
| 2003/0135304 | A1 * | 7/2003 | Sroub et al. | 701/1 |
| 2004/0039516 | A1 * | 2/2004 | Willembrock | 701/117 |

FOREIGN PATENT DOCUMENTS

| | | |
|---|---|---|
| WO | WO 00/54143 | 9/2000 |

* cited by examiner

METHOD AND SYSTEM FOR OBTAINING TRAFFIC SIGN DATA USING NAVIGATION SYSTEMS

BACKGROUND OF THE INVENTION

The present invention relates to collecting geographic data for a geographic database and more particularly, the present invention relates to a method and system for collecting traffic sign data for a geographic database using navigation systems.

Geographic databases have various uses. Geographic databases are used in in-vehicle navigation systems, personal computers, networked computing environments, and various other kinds of platforms, as well as on the Internet. Geographic databases are used with various kinds of applications to provide various navigation-related and map-related functions including map display, route calculation, route guidance, truck fleet deployment, traffic control, traffic monitoring, electronic yellow pages, roadside assistance, emergency services, and so on.

In order to provide these kinds of functions, a geographic database includes data that represent geographic features in a region. The geographic features that are represented in a geographic database may include roads, intersections, and so on. A geographic database includes information about the represented geographic features, such as the geographic coordinates of roads in a geographic region, speed limits along the road segments, locations of stop lights, turn restrictions at intersections of roads, address ranges, street names, and so on. A geographic database may also include information about points of interest in a region. Points of interest may include restaurants, hotels, airports, gas stations, stadiums, police stations, and so on.

Collecting information for a geographic database is a significant task. Not only is the initial collection of data a significant undertaking, but a geographic database needs to be updated on a regular basis. For example, new streets are constructed, street names change, traffic signals are installed, and turn restrictions are added to existing roads. Also, new levels of detail may be added about geographic features that are already represented in an existing geographic database. For example, an existing geographic database for roads may be enhanced with information about lane widths, shoulder sizes, traffic signs, lane barriers, address ranges, sidewalks, bicycles paths, etc. Thus, there exists a need to continue to collect information for a geographic database.

One type of information that is useful to include in a geographic database is traffic sign information. Traffic signs are not assigned consistently throughout a region or country. Therefore, prior methods for collecting traffic sign information have required field personnel from a geographic database developer to travel along each street in a geographic region, observe the traffic signs, record their observations and then add the traffic sign information to the geographic database. This process is relatively time-consuming and therefore relatively expensive.

Accordingly, it would be beneficial to collect traffic sign information more efficiently.

SUMMARY OF THE INVENTION

To address these and other objectives, the present invention comprises a method and system for collecting traffic sign data for a geographic database. Speed and position data are collected using a plurality of mobile computing platforms moving in a geographic region. The speed and position data are analyzed to identify a location of a traffic sign corresponding to a change in the speed. The geographic database is updated to indicate the location of the traffic sign.

DETAILED DESCRIPTION OF THE PRESENTLY PREFERRED EMBODIMENTS

I. Geographic Database

Figure 1:
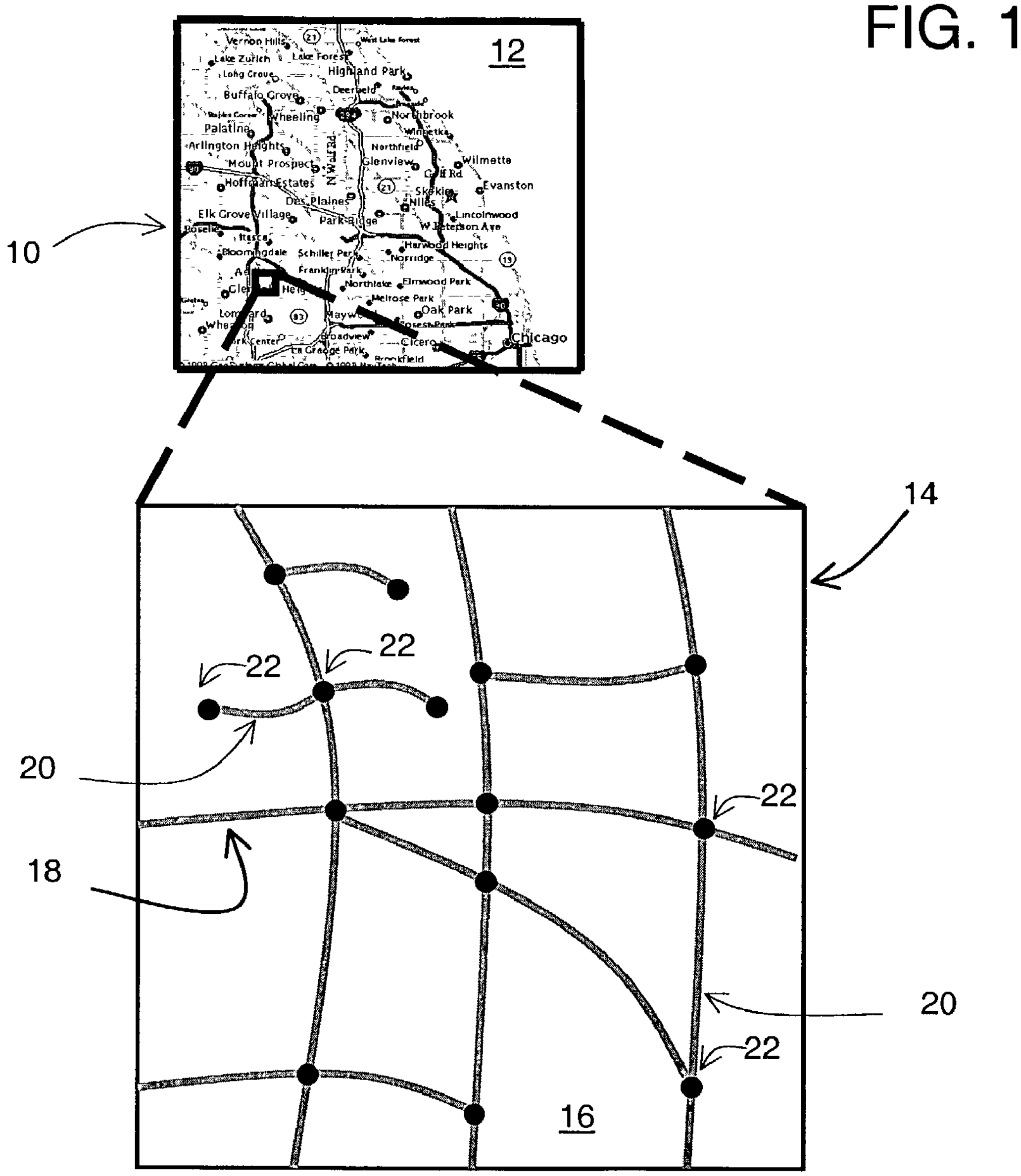
FIG. 1 shows a map of a geographic region.

FIG. 1 shows a map 10 of a geographic region 12. The geographic region 12 may correspond to a metropolitan or rural area, a state, a country, or combinations thereof, or any other area of comparable size. Located in the geographic region 12 are physical geographic features, such as roads, points of interest (including businesses, municipal facilities, etc.), lakes, rivers, railroads, municipalities, etc.

FIG. 1 also includes an enlarged map 14 of a portion 16 of the geographic region 12. The enlarged map 14 illustrates part of the road network 18 in the geographic region 12. The road network 18 includes, among other things, roads and intersections located in the geographic region 12. As shown in the portion 16, each road in the geographic region 12 is composed of one or more road segments 20. A road segment 20 represents a portion of the road. Each road segment 20 is shown to have associated with it two nodes 22; one node represents the point at one end of the road segment and the other node represents the point at the other end of the road segment. The node at either end of a road segment may correspond to a location at which the road meets another road, i.e., an intersection, or where the road dead ends.

Figure 2:
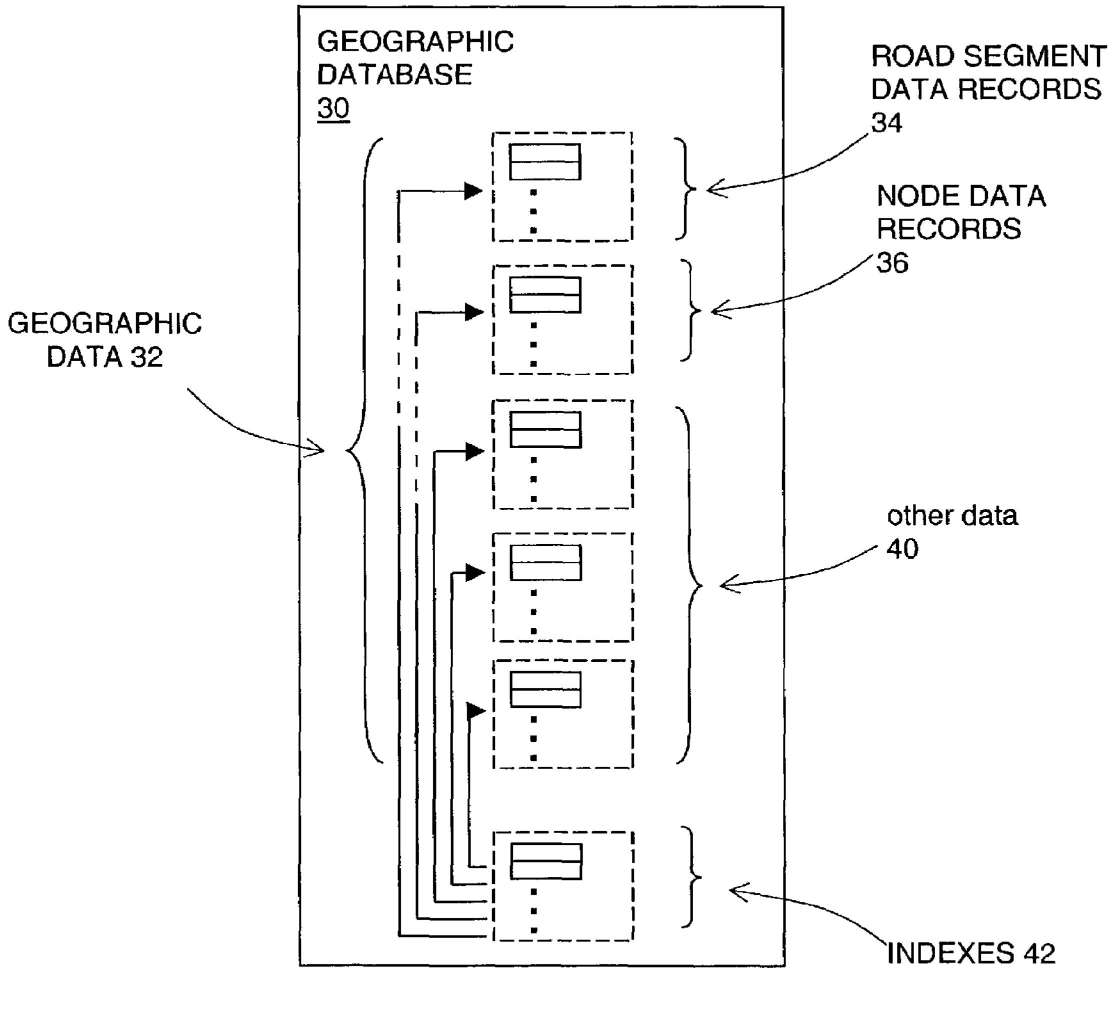
FIG. 2 is a block diagram of a geographic database that represents the geographic region of FIG. 1.

Referring to FIG. 2, a geographic database 30 contains data 32 that represents some of the physical geographic features in the geographic region (12 in FIG. 1). The data 32 contained in the geographic database 30 includes data that represent the road network 18. In the embodiment of FIG. 2, the geographic database 30 that represents the geographic region 12 contains at least one database record 34 (also referred to as "entity" or "entry") for each road segment 20 in the geographic region 12 in FIG. 1. The geographic database 30 that represents the geographic region 12 also includes a database record 36 (or "entity" or "entry") for each node 22 in the geographic region 12. (The terms "nodes" and "segments" represent only one terminology for describing these physical geographic features and other terminology for describing these features is intended to be encompassed within the scope of these concepts.)

The road segment data record 34 may contain several components. For example, the road segment data record 34 may include a segment ID by which the data record can be identified in the geographic database 30. Each road segment data record 34 has associated with it information (such as “attributes”, “fields”, etc.) that describes features of the represented road segment. The road segment data record 34 may include data that indicate the restrictions, if any, on the direction of vehicular travel permitted on the represented road segment. The road segment data record 34 may include data that indicate a speed limit or speed category (i.e., the maximum permitted vehicular speed of travel) on the represented road segment. The road segment data record 34 may also include data indicating whether the represented road segment is part of a controlled access road (such as an expressway), a ramp to a controlled access road, a bridge, a tunnel, a toll road, a ferry, and so on.

The road segment data record 34 also includes data providing the geographic coordinates (e.g., the latitude and longitude) of the endpoints of the represented road segment. In one embodiment, the data are references to the node data records 36 that represent the nodes corresponding to the endpoints of the represented road segment. The road segment data record 34 may also include or be associated with other data that refer to various other attributes of the represented road segment. The various attributes associated with a road segment may be included in a single road segment record, or may be included in more than one type of record which are cross-referenced to each other. For example, the road segment data record 34 may include data identifying what turn restrictions exist at each of the nodes which correspond to intersections at the ends of the road portion represented by the road segment, the name or names by which the represented road segment is known, the street address ranges along the represented road segment, and so on. Each of the node data records 36 may have associated information (such as “attributes”, “fields”, etc.) that allows identification of the road segment(s) that connect to it and/or its geographic position (e.g., its latitude and longitude coordinates).

The geographic database 30 may also include other kinds of data 40. The other kinds of data 40 may represent other kinds of geographic features or anything else. The other kinds of data may include point of interest data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. The geographic database 30 also includes indexes 42. The indexes 42 may include various types of indexes that relate the different types of data to each other or that relate to other aspects of the data contained in the geographic database 30.

The data records 34 in the geographic database 30 that represent roads may not necessarily include all the same types of data attributes. One reason for this is that roads do not all have the same properties. For example, some roads have a highway designation (e.g., “Wisconsin State Highway 120”) whereas other roads do not. Another reason why data records in the geographic database 30 that represent roads may not have the same data attributes is that some of the properties of a road may not have been collected or confirmed. Collecting data about roads for a geographic database may involve multiple steps. For example, road geometry data may be obtained using aerial photographs and then, traffic sign data are obtained by physically driving along the roads and recording the observed traffic signs.

In one embodiment, traffic sign data are obtained for all the roads represented in the geographic database. In another embodiment, traffic sign data are included for only some of the roads represented in the geographic database. According to this latter embodiment, some of the roads are represented by data records that do not include traffic sign data. The roads that are represented by data records that do not include traffic sign data may include only road geometry data. These may be roads for which geometry data were obtained from aerial photographs, but for which traffic sign data may not yet have been collected.

II. System for Obtaining Traffic Sign Data

A. Navigation System

Figure 3:
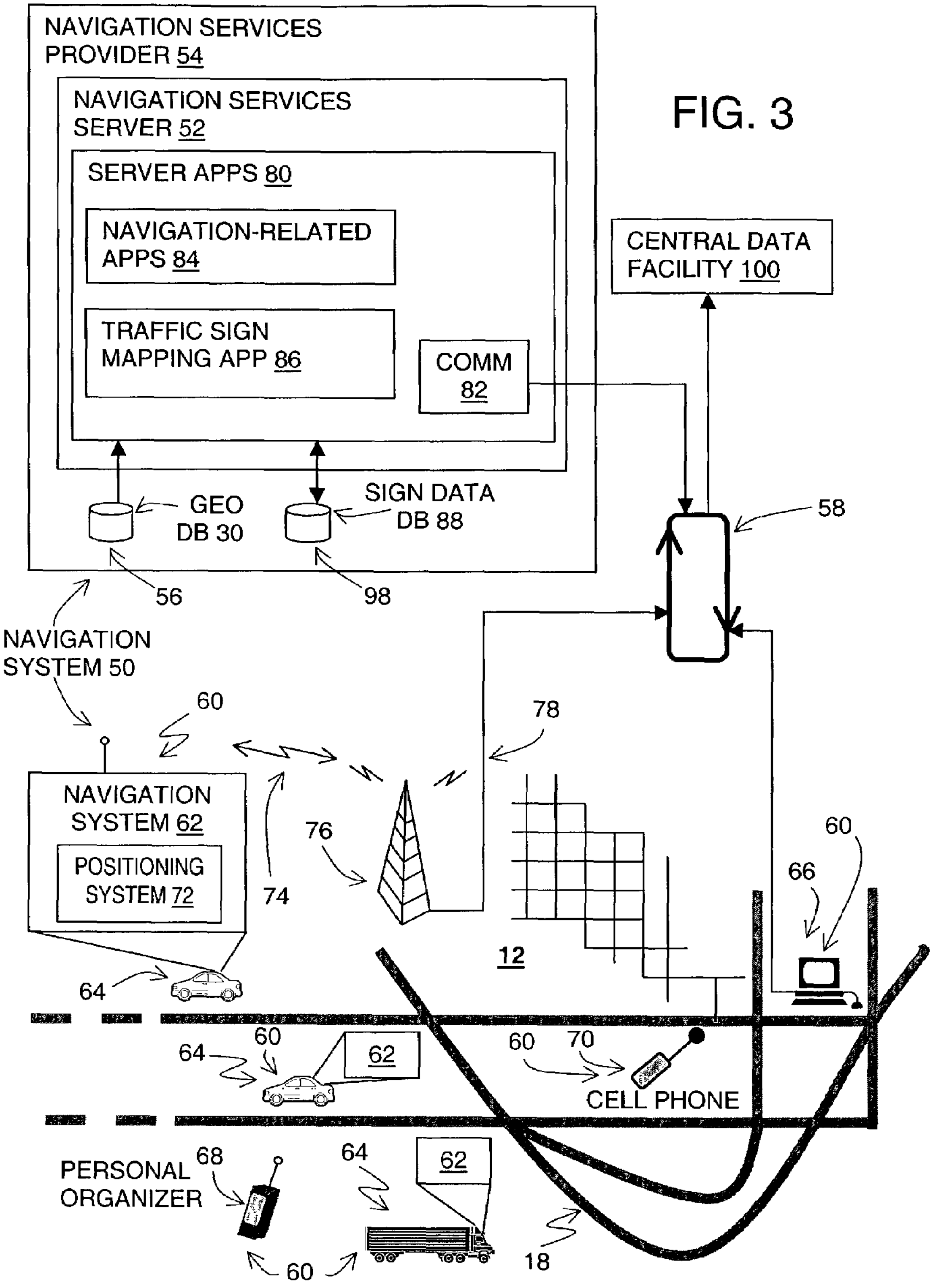
FIG. 3 is a diagram of a navigation system located in the geographic region of FIG. 1.

FIG. 3 shows the geographic region 12 and a portion of the road network 18. A navigation system 50 serves end users (e.g., vehicle drivers and passengers, as well as other persons) in the geographic region 12. The navigation system 50 is used by the end users to obtain navigation-related services (including map-related services) with respect to the geographic region 12. The navigation-related services include information about travel along the road network 18, including route calculation and guidance, people and business finding services (e.g., electronic yellow and white pages), maps, point of interest searching, destination selection, and so on.

The navigation system 50 is a combination of hardware, software and data. The navigation system 50 includes remote components (i.e., hardware, software or data located at a central location that is remote from the end users) and local components (i.e., hardware, software, or data located physically with each end user).

Included among the remote components of the navigation system 50 is a navigation services server 52. The navigation services server 52 includes appropriate computer hardware and software to run network applications. The navigation services server 52 is maintained and operated by a navigation services provider 54.

Associated with the navigation services server 52 is the geographic database 30. The geographic database 30 is stored on a storage medium 56 that is accessible to the navigation services server 52. The storage medium 56 may include one or more hard drives or other storage media. The geographic database 30 may be organized to facilitate performing navigation-related functions. Methods of organizing a geographic database to enhance the performance of certain navigation-related functions are described in U.S. Pat. Nos. 5,974,419, 5,968,109 and 5,953,722 the entire disclosures of which are incorporated by reference herein. In one embodiment, the geographic database 30 is developed by NAVTEO (formally Navigation Technologies) Corporation of Chicago, Ill. However, it is understood that the inventive concepts disclosed herein are not restricted to any particular source of data.

The local components of the navigation system 50 include the various computer platforms 60 operated by the end users to request and obtain navigation-related and map-related features and geographic data from the navigation services provider 54. These various computer platforms 60 (also referred to as “end user computing platforms” or “client computing platforms”) may include navigation system units 62 located in vehicles 64, personal computers 66, personal organizers (e.g., PDAs, PalmPilot®-type devices) 68, wireless phones 70, or any other types of computing devices that have the appropriate hardware and software to access the navigation services provider 54 over a data network 58.

Referring to the embodiment of FIG. 3, some of the end user computing platforms 60 include positioning equipment 72. The positioning equipment 72 may include a GPS system, inertial sensors, wheel pulse sensors, etc. Using this positioning equipment 72, the position of the end user's computing platform 60 can be determined. Methods for determining position are disclosed in U.S. Pat. No. 6,192,312, the entire disclosure of which is incorporated by reference herein. Some of the end user computing platforms 60 also include speed equipment to measure the speed of the vehicle. The speed equipment may include an odometer, speed pulse sensor, compass or other components that sense the speed, orientation, direction, angular acceleration, and so on.

The data network 58 may use any suitable technology and/or protocols that are currently available, as well as technology and/or protocols that become available in the future. For example, the data network may use WAP, TCP/IP, etc. More than one protocol may be used in the data network 58 with appropriate conversions. The data network 58 may be part of, or connected to, the Internet.

A portion of the network 58 may include a wireless portion 74. The wireless portion 74 of the data network 58 enables two-way communication between the mobile end user computing platforms 60 and the service provider 54. The wireless portion 74 may be implemented by any suitable form of wireless communication, including cellular, PCS, satellite, FM, radio, or technologies that may be developed in the future. The wireless portion 74 may include one or more transmitters 76, such as a transponder tower, an antenna tower, an FM tower, satellites, or other suitable means. The transmitters 76 include an appropriate communication link 78 to the network 58 and/or service provider 54. This link 78 may be land-based or may be wireless. The transmitters 76 include suitable technology that enables two-way communication between the service provider 54 and the mobile end user computing platforms 60.

The navigation system 50 of FIG. 3 can accommodate different types of end user computing platforms 60. The navigation system 50 allows end users who have different types of computing platforms 60 to obtain navigation services from the navigation services provider 54 and to obtain and use geographic data provided from the navigation services provider 54. Using data that indicate the end user's positions from the position equipment 72 of the end user computing platforms 60, the navigation services server 52 may provide navigation-related services with respect to the geographic region 12.

Referring to FIG. 3, server applications 80 are included on the navigation services server 52 of the navigation services provider 54. The server applications 80 may be stored on one or more hard drive(s) or other media operated by the server 52 and loaded into a memory of the server 52 to run. One of the server applications 80 is a communications application 82. The communications application 82 interfaces with the data network 58 in order to receive messages from and send messages to the end users.

Included among the server applications 80 are navigation-related applications 84. The navigation-related applications 84 use the geographic database 30 associated with the navigation services server 52 in order to provide the various different types of navigation-related services. In order to provide navigation-related features, the navigation-related applications 84 use data from the geographic database 30.

One of the navigation-related applications 84 is a route calculation application. End users may access the navigation services provider 54 to obtain a route from an origin to a destination. The route calculation application determines the route for the end user to travel along the road network 18 to reach the desired destination. In order to calculate a route, the route calculation application is provided with data identifying a starting location (origin) and a desired destination location. In one embodiment, the starting location may be the end user's current position and the destination may be entered by the end user. Given at least the identification of the starting location (origin) and the desired destination location, the route calculation application determines one or more solution routes between the starting location and the destination location. A solution route is formed of a series of connected road segments over which the end user can travel from the starting location to the destination location. When the route calculation application calculates a route, it accesses the geographic database 30 and obtains data that represent road segments around and between the starting location and the destination location. The road calculation application uses the data to determine at least one valid solution route from the starting location to the destination location.

In one embodiment, the route calculation application may attempt to find a solution route that takes the least time to travel. Each of the road segment data records 34 of the geographic database 30 has an associated default segment cost or travel time for the particular represented road segment. The segment cost or travel time for the particular represented road segment considers the type of road, such as freeway or residential street, speed limit and distance of the segment. In one embodiment, the route calculation application may consider traffic conditions to more accurately reflect actual travel time over the connected road segments. When the route calculation application determines one or more solution routes comprising the series of connected road segments, the travel times for each of the included connected road segments is summed to provide an estimated route travel time. Based on the route travel time, the route calculation application selects the quickest route. Once the route calculation application has selected the route, the route calculation application provides an output in the form of an ordered list identifying a plurality of road segments that form the continuous navigable route between the origin and the destination. In addition, the route calculation program provides an output of an estimated route travel time.

Methods for calculating routes are disclosed in U.S. Pat. No. 6,192,314, the entire disclosure of which is incorporated by reference herein. (The methods disclosed in the aforementioned patent represent only some of the ways that routes can be calculated and the claimed subject matter herein is not limited to any particular method of route calculation. Any suitable route calculation method now known or developed in the future may be employed.)

Another of the navigation-related applications 84 on the navigation services server 52 is a route guidance application. The route guidance application uses the output from the route calculation application to provide maneuver instructions for the end user to travel to the desired destination on the calculated route. The route guidance application generates an output comprised of a series of maneuvers derived from the list of road segments provided in the output of the route calculation application. The output of the route guidance application is provided to the end user through a user interface included on the computing platform 60. The output of the route guidance may be conveyed audibly through speech synthesis or on a visual display. Using data that indicate the end user's positions, the route guidance application on the navigation services server 52 determines the appropriate times and locations at which to provide maneuvering instructions. The route guidance maneuvers instruct the end user to turn in a specified direction at specified nodes connecting road segments of the route. Methods for providing route guidance using geographic data are disclosed in U.S. Pat. No. 6,199,013, the entire disclosure of which is incorporated herein by reference. (The methods disclosed in the aforementioned patent represent only some of the ways that route guidance can be calculated and the claimed subject matter herein is not limited to any particular method of route guidance. Any suitable route guidance method now known or developed in the future may be employed.)

Referring to FIG. 3, end users are located throughout and move about the geographic region 12. The end users use various means of transportation to move in the geographic region 12. For example, end users may use automobiles, trucks, buses, bicycles, motorcycles, trains, taxis, horses, and so on. As the end users move throughout the geographic region, they use mobile or portable computing platforms 60 to obtain geographically-related services and features. The end users may communicate with the navigation services server 52 over the data network 58 to implement the geographic-related services and features.

Figure 4:
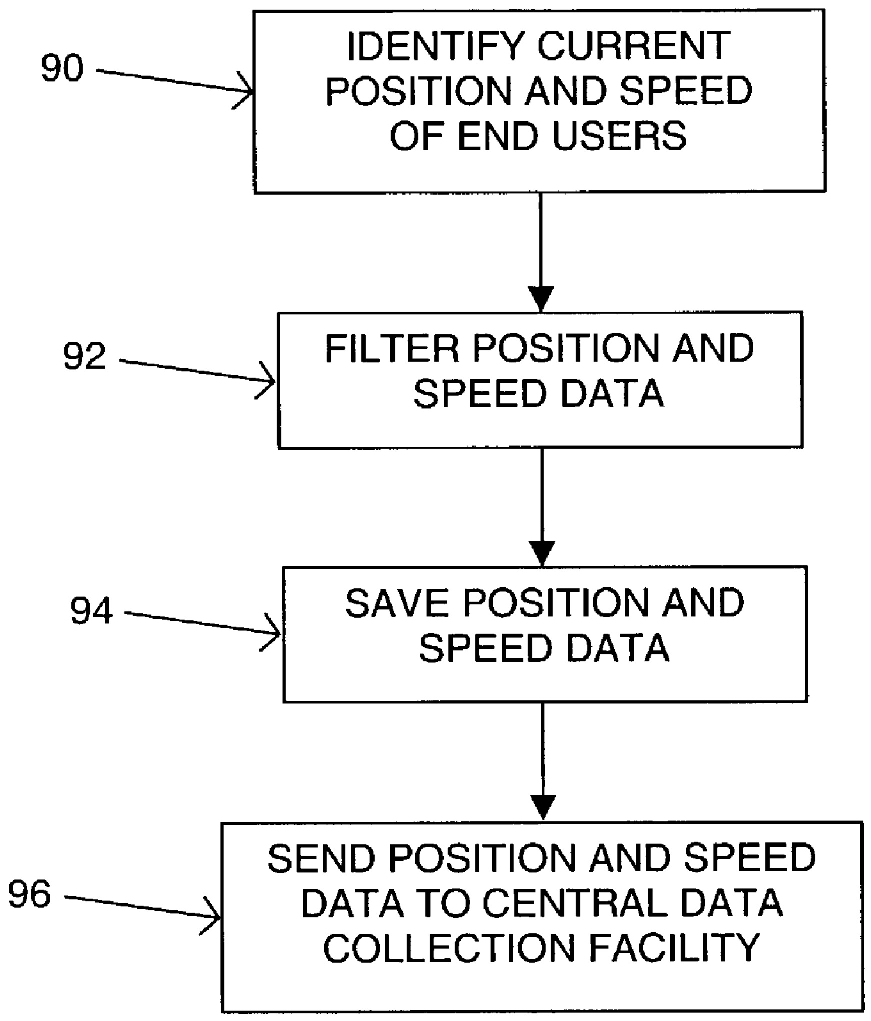
FIG. 4 is a flow chart of the operations of a navigation services server for collecting sign data.

While providing the geographic-related services and features to the end users, the navigation services provider 54 may collect traffic sign data. Included among the server applications 80 on the navigation services server 52 is a traffic sign mapping application 86. The traffic sign mapping application 86 collects position and speed data of end users for identifying the locations of roadside traffic control devices, such as speed-related traffic signs. Roadside traffic control devices affect how the end users travel on the road segment. For example, the roadside traffic control devices, such as stop signs and traffic lights, cause the end users to stop at certain points. FIG. 4 is a flow chart of the operations of the navigation services server 52 for collecting traffic sign data according to one embodiment. In the embodiment of FIG. 4, the traffic sign data collected comprises position and speed information of a number of end users moving in the geographic region 12. As the end users travel through the geographic region 18, the navigation services server 52 identifies the current position and current speed of the end users at step 90.

In one embodiment, the position of the end user may be determined by positioning equipment associated with the end user's computing platform (such as the positioning system 72 in FIG. 3). The position of the end user may be determined by other methods. For example, the position of the end user may be determined by network-based location identification (e.g., emergency 911 services). The position of the end user may also be determined by obtaining the end user's input. The navigation services server 52 receives the position data routinely, such as every second, via the data network 58. In an alternative embodiment, the navigation services server 52 may request position information from the end users via the data network 58.

The speed of the end user may be determined by speed equipment associated with the end user's computing platform. In another embodiment, the speed information may be represented as velocity data comprising both the magnitude component and a direction component. The navigation services server 52 receives the speed data routinely, such as every second, via the data network 58. In an alternative embodiment, the navigation services server 52 may request information from the end users via the data network 58. The speed of the end user may be determined by other methods. In one embodiment, the server 52 may determine the both the speed and direction of travel using the position information. For example, the speed is calculated from the distance covered between the current position and the previous position, and from the elapsed time between the positions. The direction is a direction on the road segment from the previous position to the current position.

In an alternative embodiment, each end user may identify its current position and speed very frequently, such as every second, and temporarily record the current position and speed data along with a time. After a certain period of time, such as several minutes, the end user transfers the recorded position and speed data to the navigation services server 52 via the data network.

Referring to step 92 of FIG. 4, the navigation services server 52 filters the raw position and speed data from the end users into a filtered set of data according to specified filtering criteria. The filtering criteria may be selected such that the quality of the data can be assumed to have minimal random speed changes or stops not associated with traffic signs. Additionally, the filtering criteria may be selected to identify traffic signs in a particular portion of the geographic region. The navigation service server 52 saves the position and speed data meeting the filtering criteria and discards the position and speed data not meeting the filtering criteria. The filtering criteria may be established by the navigation services provider 54 or by the geographic database provider.

The filtering criteria may be a designated portion of the road network 18 such as a group of road segments represented in the geographic database 30. To filter the raw data according to the location filtering criteria, the navigation services server 52 saves the position and speed data of the end users whose position data is located on one of the selected represented road segments in the geographic database 30 and discards the other data. The filtering criteria may be specified portions of the road segments, such as near intersections. The filtering criteria may also be specific end users such as fleet vehicles or registered probe vehicles. In addition to receiving current position and speed information from the end users, the navigation services server 52 may receive information identifying the end users. The end user may be a registered user of the navigation services provider 54, and the identifying data received may be an end user ID. To filter the raw data according to the identity filtering criteria, the navigation services server 52 saves the position and speed data of the end users having the required IDs and discards the other data. Another filtering criteria is whether the end user is following a calculated route and/or route guidance. By collecting position and speed data of end users following a calculated route and/or route guidance, the quality of the data can be assumed to have minimal random stops or speed changes not associated with traffic signs on the route. Other filtering criteria may be the time of day, such as avoiding rush hour traffic congestion. In other embodiments, the filtering criteria may be any other criteria.

In another embodiment, the navigation services server 52 may combine the steps of collecting the position and speed data and filtering the data. In this embodiment, the navigation services server 52 only collects position and speed data from end users that meet the filtering criteria. In another embodiment, the filtering step 92 may be skipped completely by the navigation services server 52.

At step 94, the navigation services server 52 saves the position and speed data. The navigation services server 52 may also save additional data associated with the position and speed data of the end user. The additional data may include the road segment represented in the geographic database 30 on which the end user is located. The additional data may also include the ID of the end user, time and date or any other data.

In one embodiment, the navigation services server 52 saves the position data, speed data, and the other data together in a file or in a sign data database 88. When the position data, speed data and the other data are saved, they are saved as related entries in the file or database 88 so that there is an indication that these data are related to each other. The sign data database 30 is stored on a storage medium 98 that is accessible to the navigation services server 52. The storage medium 98 may include one or more hard drives or other storage media. From time to time, the data in the sign data database 88 are sent from the navigation services provider 54 a central data collection facility 100 at step 96.

B. Central Data Collection Facility

A geographic database can be updated using data collected by a plurality of end users traveling in a geographic area. One method for updating a geographic database using information gather by vehicles is described in U.S. Pat. No. 6,047,234, the entire disclosures of which is incorporated by reference herein.

Figure 5:
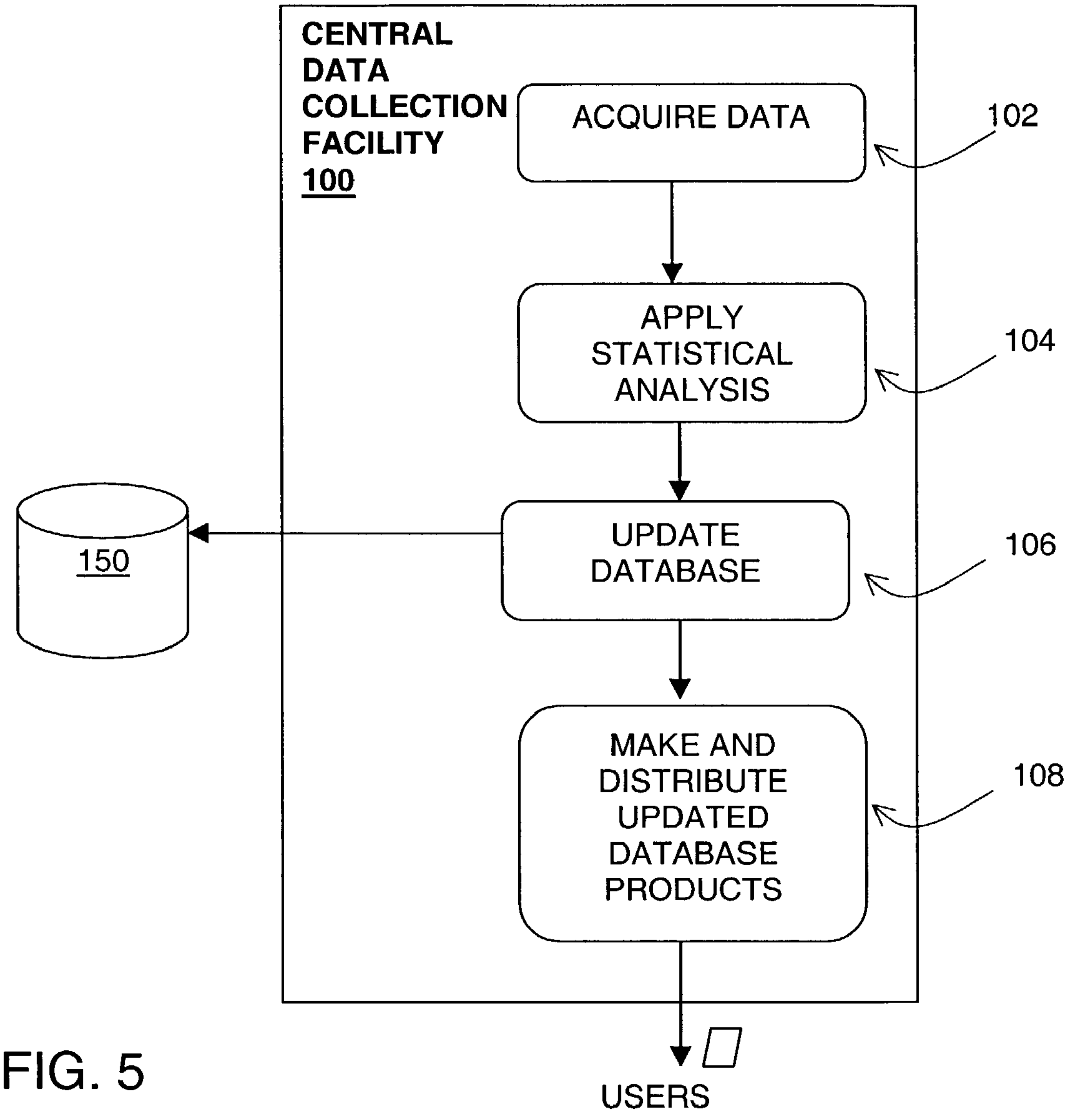
FIG. 5 is a flow chart of the operations of a central data collection facility.

According to one embodiment, the central data collection facility updates the geographic database following the steps shown in FIG. 5. The central data collection facility 100 acquires the data from the navigation services provider 54 at step 102. The central facility 100 may obtain the data from the navigation services provider 54 by wireless data transmission or by other means (e.g., sending a diskette or via modem). In another embodiment, the central facility 100 may obtain data from other sources such as from a plurality of individual vehicles or any other sources.

The central facility 100 processes the data using statistical analysis techniques at step 104. The statistical analysis techniques analyze the position, speed and other data collected over time to identify the locations of roadside traffic control devices or traffic signs. The data is collected for numerous days, weeks, months or any time frame to obtain a large sample of data for statistical analysis. In one embodiment, the data collected over time for each road segment is analyzed to identify any traffic signs associated with the road segment. In another embodiment, the data collected over time for each intersection is analyzed to identify any traffic signs associated with the intersection. The statistical analysis identifies changes in the magnitude of the speed data for numerous end users that infer a location of a traffic sign.

Figure 6:
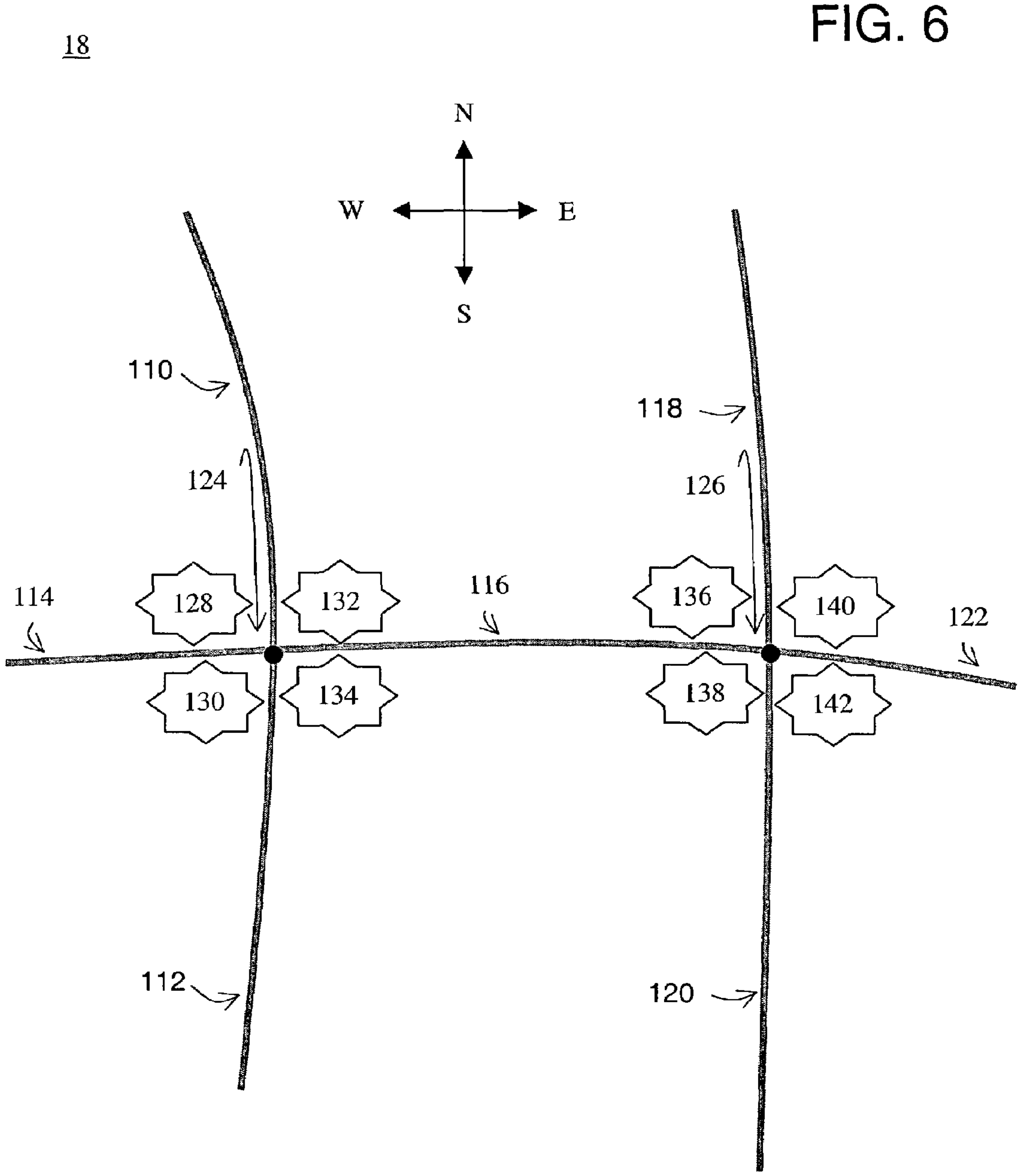
FIG. 6 shows the road segments of a portion of a geographic region.

FIG. 6 illustrates a portion of the road network 18 comprising a group of road segments 110, 112, 114, 116, 118, 120 and 122. The central facility 100 processes the data for each road segment using the statistical analysis techniques to identify any traffic signs and signals associated with each road segment. The statistical analysis may discard certain data that may not accurately represent the speed changes due to traffic signs. For example, data collected during rush hour may include significant changes in the speed data that is not associated with a traffic sign but rather is caused by traffic congestion. In another embodiment, the central facility 100 may filter the data according to similar filtering criteria discussed above in conjunction with FIG. 4 at step 92.

The central facility 100 processes the data to identify changes in the speed data that are associated with a traffic sign. For example, the statistical analysis may illustrate that a vast majority of end users traveling south on road segment 110 all reduced their speed and eventually stopped prior to the intersection represented by node 124. Likewise, the statistical analysis may illustrate that a vast majority of end users traveling north on road segment 112 all reduced their speed and eventually stopped prior to the intersection represented by node 124. Additionally, the statistical analysis may also illustrate that a majority of end users traveling east on road segment 114 reduced their speed without stopping and preceded through the intersection represented by node 124. Likewise, the statistical analysis may illustrate that a majority of end users traveling west on road segment 116 reduced their speed without stopping and preceded through the intersection represented by node 124. The statistical analysis for this example identifies a stop sign associated with road segment 110 at position 128 for the south bound direction, a stop sign associated with road segment 112 at position 134 for the north bound direction. Additionally, the statistical analysis for this example identifies no stop signs associated with road segment 114 at position 130 for the east bound direction and with road segment 116 at position 132 for the west bound direction.

The central facility 100 statistical analysis techniques also identify any traffic signals associated with each road segment. For example, the statistical analysis may illustrate that at certain times the end users traveling south on road segment 118 reduced their speed and eventually stopped prior to the intersection represented by node 126, and at other times, the end users do not stop before proceeding through the intersection. Likewise, the statistical analysis may illustrate that the majority of end users traveling north on road segment 120, east on road segment 116 and west on road segment 122 all reduced their speed and at times eventually stopped prior to the intersection represented by node 126 and at other times the end users did not stop before proceeding through the intersection. The statistical analysis for this example identifies a traffic signal arrangement at node 126 comprising a traffic light granting the right-of-way and stopping traffic travelling south on road segment 118 at position 136, a traffic light granting the right-of-way and stopping traffic travelling north on road segment 120 at position 142, a traffic light granting the right-of-way and stopping traffic travelling east on road segment 116 at position 138, and a traffic light granting the right-of-way and stopping traffic travelling west on road segment 122 at position 140.

Additionally, the statistical analysis may identify a timing pattern for the traffic signal arrangement at node 126. First, the statistical analysis may illustrate a percentage of end users that stop for the traffic signal out of a sample of end users traveling straight through the intersection. For example, the statistical analysis may illustrate that of the end users traveling south on road segment 118 and proceeding straight through the intersection represented by node 126 to road segment 120, thirty percent of the end users stop. The statistical analysis for this example provides a reasonable estimate of time that the traffic light is red in the south direction for road segment 118. For this example, the traffic light is red approximately thirty percent of the time.

Furthermore, the statistical analysis may identify an average waiting time for the end users that do stop for the red light associated with the south bound road segment 118 and intersection at node 126. In the absence of rush-hour traffic, the statistical analysis identifies the wait time as a flat distribution from zero to N seconds, where N is the duration of the red light for the end users approaching from that direction. For example, if the red light lasts thirty seconds for the south direction, then the waiting times for the end users will be roughly evenly distributed between zero and thirty seconds with a few cars waiting slightly more than thirty seconds. The slightly greater than thirty second wait time occurs when the end user must wait for another vehicle stopped ahead of the end user. The statistical analysis may further use the position data to determine how close to the intersection the end user is located when estimating the average wait.

Additionally, the statistical analysis may identify whether the traffic light has fixed timings or has flexible timings with automatic-traffic-sensing. The fixed timing traffic light provides the right-of-way and stop signals for fixed amounts of time. If the statistical analysis indicates that the wait times discussed above are generally uniform throughout the day, excluding rush hour, the traffic light has fixed timings. Additionally, the statistical analysis may identify the times of the day or cycle that the light provides the right-of-way and stop. The flexible timing traffic lights detect approaching end users and adjust the amount of time for the right-of-way and stop signals accordingly. For example, if an end user pulls up to a stop light when there are no other vehicles at the intersection from any direction, the flexible light will provide the right away in a short period of time, such as five seconds or less. If the statistical analysis indicates that the wait times discussed above are especially short between the hours of midnight and 5 am, the traffic light has flexible timings with automatic-traffic-sensing. Moreover, the statistical analysis may also identify other features of the traffic signal. For example, the timing pattern for any left turn and right turn arrows associated with the intersection may be established.

In addition to identifying stop signs and traffic signals, the statistical analysis may be used to infer other traffic signs. Warning signs having associated recommended speeds may be inferred. For example, the statistical analysis may illustrate that end users traveling on a road segment reduced their speed from approximately the speed limit associated with the road segment to approximately forty miles per hour. A directional component of the velocity data may also illustrate a change in direction associated with the decrease in speed. The statistical analysis for this example infers a possible warning sign associated with a curve having an associated recommended speed of approximately forty miles per hour. The statistical analysis may be used to identify numerous traffic signs, such as yield signs, caution signs, warning signs, speed limit signs, and any type of traffic sign.

In addition to identifying traffic signs, the statistical analysis of the speed data may identify locations appropriate for a change in vehicle speed. Certain road segments may have portions not associated with a specific traffic sign where a change in speed would offer safety or other benefits. For example, the statistical analysis may illustrate that a majority of the end users traveling on a road segment abruptly reduced their speed from approximately the speed limit at a similar position away from an intersection followed by an increase in speed. The statistical analysis of this example identifies a road hazard at the position.

The road hazard may be a speed bump, dip, pothole, rough road, construction barrier, or any type of road hazard. The statistical analysis may further identify whether the road hazard is a permanent feature of the road segment or a temporary feature. For example, the statistical analysis may identify that at the position at which the majority of the end users abruptly reduced their speed away from an intersection followed by an increase in speed for several weeks, the end users no longer reduced their speed. The statistical analysis of this example identifies the likely presence of a pothole that was repaired at the position. If the abrupt speed change remains for a considerable amount of time, the statistical analysis establishes the likely presence of a speed bump, especially if the road segment is a neighborhood street.

Additionally, the statistical analysis may identify an appropriate vehicle speed for portions of a road segment. For example, the statistical analysis may illustrate that a majority of end users traveling an exit ramp reduced their speed to approximately thirty miles per hour. The statistical analysis of this example identifies an appropriate speed reduction for end users traveling the exit ramp. Moreover, the statistical may identify the appropriate speed for other road segments, such as mountain road segments or road segments with considerable curves.

Furthermore, the statistical analysis of the speed and position data may identify positions of recurring delays on road segments. The recurring delays on the road segments have many causes including roadside traffic control devices, such as stop signs and traffic lights, road segment geometry, such as curves and hills, road hazards, such as speed bumps and potholes. Moreover, the recurring delays may repeat at certain times of the day for certain days of the week. For example, the statistical analysis may illustrate that at certain times of the day, such as weekdays between 4:30 pm and 4:45 pm, a majority of end users traveling on a road segment travel at slower speeds than at the other times of the day and week. The recurring delay may be attributed to many reasons, such as a large parking lot exiting onto the road segment from which at 4:45 pm on weekdays nearly one thousand workers end their work shift. For the purposes of identifying the recurring delay, the reason for the delay may not be necessary to determine. In one embodiment, the statistical analysis of the speed and position data simply identifies the positions of recurring delays without attempting to identify the cause of the delays. In another embodiment, the statistical analysis determines speed profiles and time delay profiles for the recurring delay. The speed profile for the recurring delay is an average speed of the end users to proceed through a portion of the road segment associated with the recurring delay. The time delay profile for the recurring delay is an average delay time experienced by the end users from the recurring delay.

Moreover, the statistical analysis may identify travel-speed profiles for road segments at different times of the day. For example, the statistical analysis may illustrate that at certain times of the day, end users traversing a road segment average a certain speed across the road segment, such as approximately five miles per hour less than the associated speed limit for the road segment. While at other times of the day, the end users average speed is approximately ten miles per hour less than the associated speed limit for the same road segment. The travel-speed profile incorporates the recurring delays from stop signs, traffic lights, road segment geometry and road hazards without identifying the cause of the delay. The travel-speed profile provides a representation of traffic patterns on the road segment at different times.

Additionally, the statistical analysis may identify travel-time profiles for road segments at different times of the day. For example, the statistical analysis may illustrate that at certain times of the day, end users traversing a road segment average a certain speed across the road segment, such as approximately five miles per hour less than the associated speed limit for the road segment. While at other times of the day, the end users average speed is approximately ten miles per hour less than the associated speed limit for the same road segment. Based upon these average speeds, the average time for end users traversing the road segment may be determined. In an alternative embodiment, the end user's average speed for a segment can be calculated from the total time that it takes the end user to traverse that segment, and from the length of the segment based on starting position, ending position (and optionally intermediate positions if the segment isn't straight). That is, the average speed for a segment can be computed from the total distance and total time associated with traversing that segment, rather than measuring the speed every second. The travel-time profile incorporates the time spent at recurring delays from stop signs, traffic lights, road segment geometry and road hazards without identifying their location. The travel-time profile provides a representation of traffic patterns on the road segment at different times.

After the statistical analysis, the traffic sign data and other data are stored in a master copy 150 of the geographic database at step 106. The traffic sign data may be stored as an attribute to a road segment data record. In one embodiment, the location of the traffic sign is represented as a position along the road segment, such as three feet from the end of the road segment. In another embodiment, the location of the traffic sign may be the geographic coordinates (e.g., the latitude and longitude) of the represented traffic sign or signal. In another embodiment, the traffic sign data may be stored as attributes to a node data record. Additionally, any information about the traffic sign, such as traffic light timing pattern, may also be stored as an attribute to the road segment data record or node data record. For the data identifying locations appropriate for a change in vehicle speed, such as exit ramps, road hazards and speed bumps, the data may be also stored as an attribute to a road segment data record. Additionally, the recurring delay positions may be stored as an attribute to the road segment data as a location along the road segment. The travel-speed profile and travel-time profile may similarly be stored as an attribute to the road segment. In an alternative embodiment, the data may be stored in a separate database record than the road segment data record or a separate database from the master copy 150 of the geographic database. For example, the travel-speed profile and the travel-time profile may be stored in an optimization database for use with routing calculations.

The traffic sign data that are stored in the master copy 150 of the geographic database may be used to update existing data or to add new data. For example, the master copy 150 of the database may already include traffic sign data for a particular represented road segment. The new traffic sign data obtained using the process described in FIGS. 4 and 5 can be used to update the existing data, e.g., confirm the existing data or make the existing data more accurate. Alternatively, the master copy 150 of the geographic database may not include traffic sign data for a particular road segment. If new traffic sign data are obtained for a road segment that is represented by a data record that does not already include a traffic sign data attribute, the new traffic sign data can be added as a new attribute of the data record.

In one embodiment, prior to updating existing data or adding new data to the master copy of the geographic database with the traffic sign data, the existence and position of some the identified traffic signs may be confirmed by direct observation of field personnel. Additionally, field personnel confirm and research the position of identified road hazards, locations appropriate for a change in vehicle speed and positions of recurring delays.

The geographic database with new or improved traffic sign data and other data can be used to make derived database products at step 108. The derived database products may include only portions of all the data in the master version 150 of the database. For example, the derived database products may include data that relate to only one or more specific regions. The derived database products may be used on various kinds of computing platforms. For example, the derived database products may be used in navigation systems (such as in-vehicle navigation systems and hand-held portable navigation systems), personal computers (including desktop and notebook computers), and other kinds of devices (such as PalmPilot®-type devices, pagers, telephones, personal digital assistants, and so on). Derived database products may also be used on networked computing platforms and environments, including the Internet. Moreover, the derived database product may be supplied to the navigation services provider 54 in FIG. 3.

The derived database products may be in a different format than the format in which the master copy of the database is maintained. The derived database products may be in a format that facilitates the uses of the derived products in the platforms in which they are installed. The derived database products may also be stored in a compressed format on the media on which they are located.

In an alternative embodiment, the navigation services server 52 of FIG. 3 may perform the steps of the central facility 100. In this embodiment, rather than sending the sign data to the central facility 100, the navigation services server 52 performs the statistical analysis on the sign data to identify the traffic signs. The navigation services server 52 then updates the geographic database 30 in a similar manner as performed by the central facility as described above. Additionally, the navigation services server 52 may make and distribute updated database products.

In another alternative embodiment, the central data facility 100 may perform the traffic sign mapping application 86 of the navigation services server 52. In this embodiment, the central facility 100 includes many of the features of the navigation services provider 54 enabling the central data facility 100 to collect position and speed data from the plurality of end users.

III. Alternatives

A. Standalone Navigation System

As explained above, there are different kinds of mobile and portable computing platforms that end users can use to obtain geographically-based features and services. These different kinds of mobile and portable computing platforms include standalone systems, such as in-vehicle navigation systems. With a standalone system, the navigation application software and geographic database are located locally, i.e., with the navigation system unit in the vehicle. The standalone systems are capable of performing the route calculation and route guidance applications.

Figure 7:
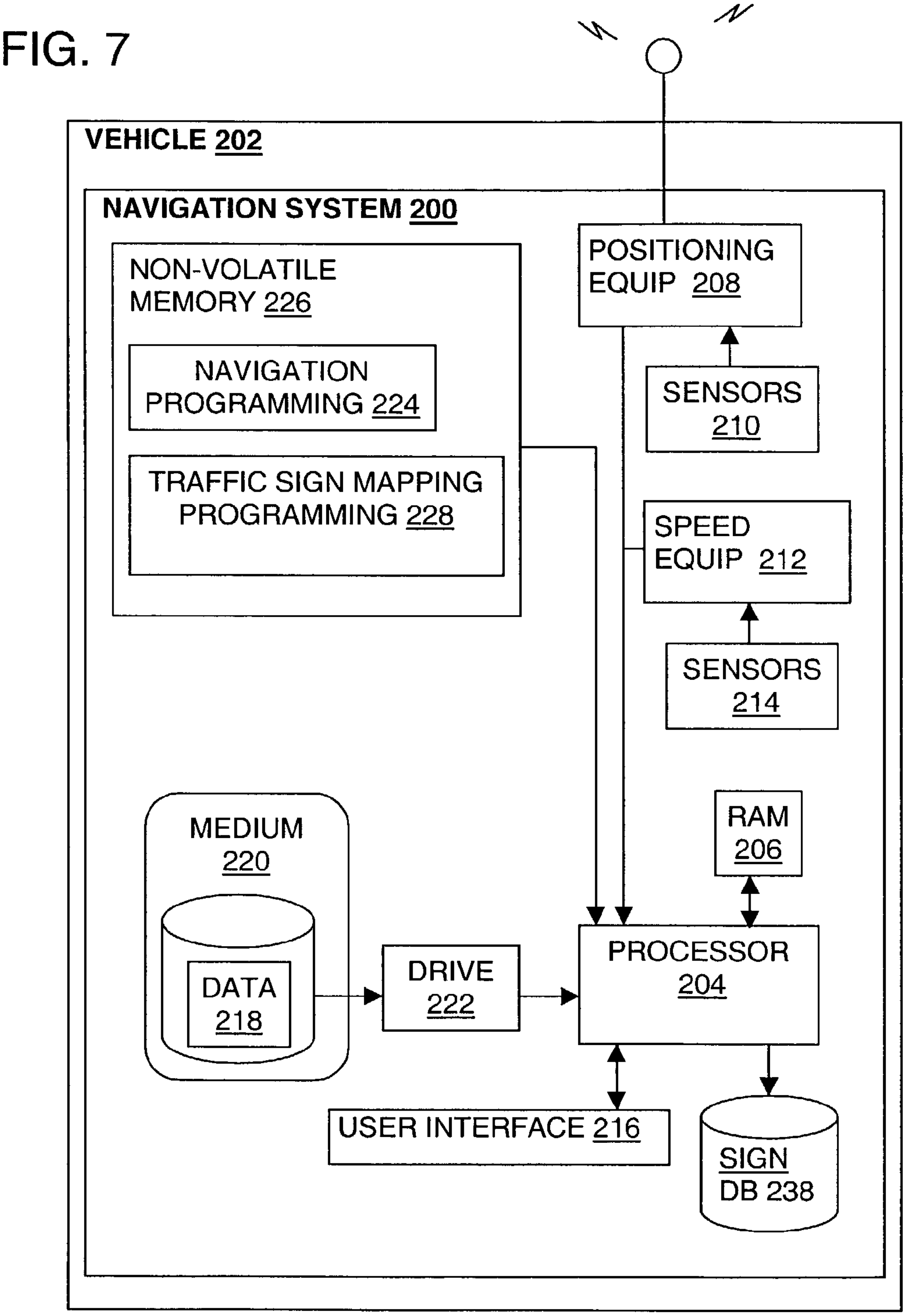
FIG. 7 is a diagram of a navigation system located in a vehicle.

In addition to providing navigation features, the standalone system may also collect traffic sign data. Referring to FIG. 7, there is a diagram illustrating an exemplary embodiment of a navigation system 200 capable of collecting traffic sign data. In the embodiment shown in FIG. 7, the navigation system 200 is located in a vehicle 202, such as an automobile, truck, or bus. The navigation system 200 is a combination of hardware and software components. The hardware components of the navigation system 200 may include a processor 204, memory 206, and so on. The navigation system 200 also includes positioning equipment 208 that determines the position of the vehicle 202 in which it is installed. The positioning equipment 208 may include sensors 210 or other components that sense the speed, orientation, direction, angular acceleration, and so on, of the vehicle 202. The position equipment 208 may also include a GPS system. The navigation system 200 also includes speed equipment 212 that determines the speed of the vehicle in which it is installed. The speed equipment 212 may include sensors 214 or other components that sense the speed, orientation, direction, angular acceleration, and so on, of the vehicle 202. In another embodiment, the positioning equipment and speed equipment are combined.

The navigation system 200 also includes a user interface 216. The user interface 216 includes appropriate means for receiving instructions and/or input from an end user of the navigation system 200. The instruction receiving means may include a keyboard, keypad, or other type of input panel, a microphone, as well as other means for accepting end-user input, such as voice recognition software, and so on, through which the end user may request navigation information and services. The user interface 216 also includes appropriate means for providing information back to the end user. The information providing means may include a display and speakers (including speech synthesis hardware and software) through which the end user can be provided with information and services from the navigation system 200.

All of the components described above may be conventional (or other than conventional) and the manufacture and use of these components are known to those of skill in the art.

In order to provide navigation features to the end user, the navigation system 200 uses geographic data 218. The geographic data 218 include information about one or more geographic regions or coverage areas. The geographic data 218 may be stored in the vehicle 202 or alternatively, the geographic data 218 may be stored remotely and made available to the navigation system 200 in the vehicle 202 through a wireless communication system which may be part of the navigation system 200. In another alternative embodiment, a portion of the geographic data 218 may be stored in the vehicle 202 and a portion of the geographic data 218 may be stored in a remote location and made available to the navigation system 200 in the vehicle 202 over a wireless communication system from the remote location.

In the embodiment shown in FIG. 7, some or all of the geographic data 218 are stored on a medium 220 which is located in the vehicle 202. Accordingly, the navigation system 200 includes a drive 222 (or other suitable peripheral device) into which the medium 220 can be installed and accessed. In one embodiment, the storage medium 220 is a CD-ROM disk. In another alternative embodiment, the storage medium 220 may be a PCMCIA card in which case the drive 222 would be substituted with a PCMCIA slot. Various other storage media may be used, including fixed or hard disks, DVD disks or other currently available storage media, as well as storage media that may be developed in the future.

Referring again to FIG. 7, in addition to the hardware components and geographic database, the navigation system 200 includes or uses navigation programming 224. The navigation programming 224 includes the software that provides for the functions and/or features performed by the navigation system 200. The navigation programming 224 uses the geographic data 218 in conjunction with input from the end user via the user interface 216, and possibly in conjunction with outputs from the positioning system 208, to provide various navigation-related features and/or functions, such as route calculation and route guidance.

The navigation programming 224 may be stored in a non-volatile storage medium 226 in the navigation system 200. Alternatively, the navigation programming 224 and the geographic data 218 may be stored together on a single storage device or medium. Alternatively, the navigation programming 224 may be located at a remote location and may be provided to or accessed by the navigation system 200 over a communications system. In one embodiment, the navigation programming 224 is written in the C programming language although in alternative embodiments other programming languages may be used, such as C++, Java, Visual Basic, and so on.

Figure 8:
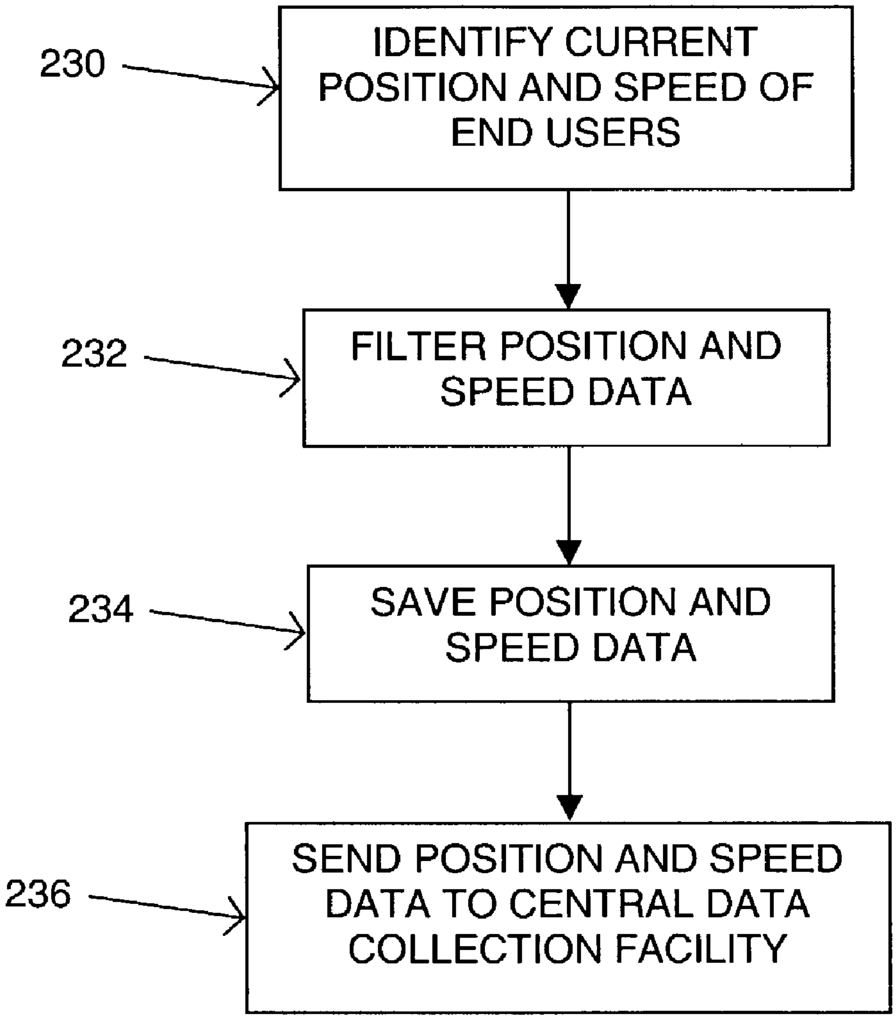
FIG. 8 is a flow chart of the operations of the navigation system of FIG. 7.

In addition to the navigation programming 224, the navigation system 200 includes traffic sign mapping programming 228. The traffic sign mapping programming 228 collects position and speed data of the vehicle 202 to be used for identifying the locations of traffic signs. FIG. 8 is a flow chart of the steps performed by the processor 204 executing the traffic sign mapping programming 228.

As the vehicle 202 travel through the geographic region 18, the navigation system 200 identifies the current position and current speed of the vehicle 202 at step 230. The position of the vehicle 202 is determined with the positioning equipment 208 using the sensors 210. The positioning equipment 208 may determine the position routinely, such as every second. The speed of the vehicle 202 is determined with speed equipment 212 using the sensors 214. The speed equipment 212 may determine the speed routinely. In another embodiment, the speed information may be represented as velocity data comprising both the magnitude component and a direction component. The speed of the end user may be determined by other methods. In one embodiment, the speed and direction of travel may be determined using the position information. For example, the speed is calculated from the distance covered between the current position and the previous position, and from the elapsed time between the positions. The direction is a direction on the road segment from the previous position to the current position.

Referring to FIG. 8, at step 232, the navigation system 232 filters the raw position and speed data of the vehicle 202 into a filtered set of data according to specified filtering criteria. The filtering criteria may be selected such that the quality of the position and speed data can be assumed to have minimal random speed changes or stops not associated with traffic signs. Additionally, the filtering criteria may be selected to identify traffic signs in a particular portion of a geographic region. The filtering criteria may be established by a navigation system provider 54, by a geographic database provider or by the central facility 100. The filtering criteria may be selected as described above. In another embodiment, the navigation system 200 may combine the steps of collecting the position and speed data and filtering the data. In this embodiment, the navigation system 200 only collects position and speed data of the vehicle that meet the filtering criteria. For example, the navigation system 200 may collect position and speed data only when the vehicle 200 is traveling a calculated route.

After the position and speed data has been filtered, the navigation system 200 saves the position and speed data that met the filtering criteria at step 234. The navigation system 200 may also save additional data associated with the position and speed data of the vehicle 202. The additional data may include the road segment represented in the geographic database 218 on which the vehicle 202 is located. The additional data may also include the time and data or any other data.

In one embodiment, the navigation system 200 saves the position data, speed data, and the other data together in a file or in a sign data database 238. When the position data, speed data and the other data are saved, they are saved as related entries in the file or database 238 so that there is an indication that these data are related to each other. The sign database or file 238 is stored on a writable, non-volatile storage medium in the vehicle 202.

Referring to FIG. 8 at step 236, from time to time, the data in the sign data database 238 are sent from the vehicle 200 to the central data collection facility 100. In the above-described embodiment, the central data collection facility 100 acquires the sign data from the navigation services server 52. In the present embodiment, the central data collection facility 100 also acquires sign data from a plurality of vehicles 202. The central facility 100 may obtain the data from the vehicle(s) 202 by wireless data transmission or by other means (e.g., sending a diskette or via modem). After acquiring the sign data from the vehicles 202, the central facility 100 performs the statistical analysis to identify the traffic signs and updates the geographic database as described above in conjunction with FIG. 5.

B. Applications for the Traffic Sign Information

The traffic sign data attributes associated with the represented road segments within the geographic database have several applications. First, the route calculation may use the traffic sign information. As discussed above, the route calculation application may attempt to find a solution route that takes the least time to travel. In calculating the travel time for possible routes, each component road segment has an associated default segment cost or travel time. Using the traffic sign information, a more accurate travel time for the component road segments may be estimated, and the best route may be selected. For example, using the timing pattern information of a traffic light associated with the road segment or intersection provides a more accurate estimate of the travel time. Similarly, the route calculation application may consider the presence of road hazards or speed bumps and avoid those road segments. In another embodiment, the route calculation may use the recurring delay data, the travel-speed profile data and/or travel-time profile data to determine the best route.

Additionally, the route guidance application may use the traffic sign information. For providing guidance for turning at an intersection, the route guidance application may inform the end users to "turn right at the stop sign." Moreover, route explication may use the traffic sign information, especially for non-real-time directions, such as those that the end user would print off from a web site. For example, "turn left at the third traffic light" on the road segment.

Furthermore, the traffic sign, road hazard or appropriate speeds for the road segments information may be used by the navigation system to provide safety warnings to end users. For example, the navigation system may inform the end user of a stop sign ahead. Additionally, the navigation system may inform the end user of a road hazard, such as a pothole or speed bump. Moreover, the navigation system may inform the end user of the appropriate speed for the road segment, such as an exit ramp. Similarly, the navigation system may inform the end user that they are approaching a position of a recurring delay. Furthermore, the navigation system may use the travel-speed profile and/or travel-time profile to inform the end user of a likely speed or travel time associated with the road segment.

It is intended that the foregoing detailed description be regarded as illustrative rather than limiting and that it is understood that the following claims including all equivalents are intended to define the scope of the invention.

We claim:

1. A method of obtaining data for a geographic database using a plurality of mobile computing platforms moving in a geographic region comprising the steps of:

for each of the mobile computing platforms, collecting data indicating speed and position of the mobile computing platform to provide collected speed data and collected position data as the mobile computing platform travels in the geographic region;

identifying a location of a traffic light;

filtering the collected speed data of the mobile computing platforms to remove the collected speed data of the mobile computing platforms related to traffic congestion from rush hour traffic but not from the traffic light to provide filtered speed data;

analyzing the filtered speed data corresponding to positions of the mobile computing platforms proximate the location of the traffic light to determine a time profile of said traffic light; and updating the geographic database to indicate said time profile of the traffic light.

2. The method of claim 1 wherein the speed data and the position data are provided over a wireless communications link from the mobile computing platform to a navigation services server.

3. The method of claim 1 wherein said step of collecting is performed by a program in the mobile computing platform.

4. The method of claim 1 wherein the mobile computing platform is a navigation system.

5. The method of claim 1 further including:

sending the speed data and the position data to a central data collection facility.

6. The method of claim 1 wherein the time profile has an associated timing pattern of an average wait time at the traffic light.

7. The method of claim 1 wherein said time profile has an associated timing pattern of a percentage of time the traffic light is red.

8. The method of claim 1 wherein said analyzing identifies directional arrows of the traffic light.

9. A method of obtaining data for a geographic database representing a geographic region using a plurality of vehicles comprising the steps of:

collecting position data from each of said plurality of vehicles to provide collected position data, said collected position data including a time stamp indicating a time when said position data was recorded;

filtering the collected position data of said vehicles to remove the collected position data of said vehicles related to portions of road segments away from intersections to provide filtered position data;

identifying a location of a traffic control device;

performing statistical analysis on said filtered position data to identify a time profile of said traffic control device; and storing data in the geographic database to indicate said time profile of the traffic control device.

10. The method of claim 9 wherein the speed and position data are collected by a navigation system associated with each of said vehicles.

11. The method of claim 9 further including:

filtering the speed and position data according to a filtering criteria.

12. The method of claim 11 wherein the filtering criteria is whether the vehicle is traveling a calculated route.

13. The method of claim 11 wherein the filtering criteria is whether the vehicle is located on a specific road segment.

14. The method of claim 9 wherein the traffic control device is a traffic light.

15. The method of claim 9 wherein said analysis identifies directional arrows of said traffic control device.

16. The method of claim 9 wherein the time profile has an associated timing pattern of an average wait time at the traffic control device.

17. The method of claim 9 wherein the time profile has an associated timing pattern of a percentage of time the traffic control device stops traffic.

18. A method of collecting data for a geographic database that represents roads in a geographic region, the method comprising:

with a plurality of vehicles that travel along the roads, recording data that indicate speeds of said vehicles at locations along the roads at a plurality of different times to provide recorded speed data, wherein said plurality of vehicles recording data travel along the roads for primary purposes unrelated to collecting of geographic data for said geographic database;

providing said recorded speed data of said vehicles to a central facility;

filtering the recorded speed data of said vehicles to remove the recorded speed data of said vehicles related to traffic congestion from rush hour traffic but not from a traffic control device to provide filtered recorded speed data;

at said central facility, statistically analyzing said filtered recorded speed data to identify a stop location at which the recorded speed data indicates that a portion of said plurality of vehicles that pass said location decrease said respective speed to a stop;

inferring a location of a new roadside traffic control device proximate said identified stop location by using a time profile related to the roadside traffic control device; and storing data in said geographic database to indicate said location of said new traffic control device.

19. The method of claim 18 further comprising:

prior to said step of storing data in said geographic database, confirming at least some of the positions of said roadside traffic control devices by direct observation by field personnel.

20. A method for collecting data for a geographic database that represents roads in a geographic region comprising the steps of:

with a plurality of vehicles traveling the roads, recording data from each of said plurality of vehicles at a plurality of different times to provide recorded position data, wherein said data from each vehicle comprises data indicating a position on said roads and a time stamp representing a time when said position data was recorded;

filtering the recorded position data to remove the recorded position data from said vehicles related to portions of road segments away from intersections to provide filtered recorded position data;

analyzing said filtered recorded position data from said plurality of vehicles to identify a portion of a road having a stop location at which the position of the vehicle does not change for a predetermined time interval;

identifying an intersection proximate said identified portion of the road having said stop location;

inferring a location of a new stop sign at said identified intersection by using a time profile related to the stop location; and storing data representing the new stop sign at said identified intersection in said geographic database.

* * * * *